US005730230A

United States Patent [19]

Sisler

[11] Patent Number: 5,730,230

[45] Date of Patent: Mar. 24, 1998

[54] ROTARY PERCUSSION DRILL

[76] Inventor: John S. Sisler, 4203 Maryland Hwy., Oakland, Md. 21550

[21] Appl. No.: 698,332

[22] Filed: Aug. 15, 1996

Related U.S. Application Data

[60] Provisional application No. 60/002,376, Aug. 15, 1995.

[51] Int. Cl.[6] .............................. B23B 45/16; B25D 11/10

[52] U.S. Cl. .............................. 173/105; 173/90; 173/114

[58] Field of Search .............................. 173/48, 104, 105, 173/90, 114

[56] References Cited

U.S. PATENT DOCUMENTS

| | | | |
|---|---|---|---|
| 3,685,593 | 8/1972 | Amstberg et al. | 173/105 |
| 4,022,108 | 5/1977 | Juvonen . | |
| 4,028,995 | 6/1977 | Salmi et al. . | |
| 4,070,949 | 1/1978 | Salmi . | |
| 4,072,198 | 2/1978 | Amteberg . | |
| 4,166,507 | 9/1979 | Bouyoucos et al. | 173/105 |
| 4,206,820 | 6/1980 | Bailey et al. | 173/105 |
| 4,343,227 | 8/1982 | Karru et al. . | |
| 4,355,691 | 10/1982 | Karru et al. . | |
| 4,366,868 | 1/1983 | Salmi . | |
| 4,462,467 | 7/1984 | Weingartner | 173/105 |
| 4,732,218 | 3/1988 | Neumaier et al. | 173/105 |
| 4,842,079 | 6/1989 | Heinonen | 173/105 |
| 5,117,921 | 6/1992 | Bartels et al. | 173/105 |
| 5,161,624 | 11/1992 | Beck et al. | 173/105 |
| 5,222,425 | 6/1993 | Davies . | |
| 5,415,240 | 5/1995 | Mundjar | 173/105 |

*Primary Examiner*—Joseph J. Hail, III
*Assistant Examiner*—Jay A. Stelacone
*Attorney, Agent, or Firm*—Sixbey, Friedman, Leedom & Ferguson, P.C.; Joan K. Lawrence

[57] ABSTRACT

A rotary percussion drill for mining, rock drilling and similar operations is provided. The drill combines a rotation portion with a percussion portion to impart a simultaneous rotational and reciprocating percussive action to the drill steel or other working element. The frequency of the percussive impact can be varied to drill efficiently rock of different hardness by changing the cross-sectional cam configuration of a camshaft which activates a reciprocating piston imparting percussive action to the drill steel or other working element.

20 Claims, 3 Drawing Sheets

ROTARY PERCUSSION DRILL

This application is a continuation-in-part of U.S. Provisional patent application Ser. No. 60/002.376, filed Aug. 15, 1995.

TECHNICAL FIELD

The present invention relates generally to rock drills useful in mining applications and specifically to a rotary percussion rock drill wherein the frequency of the impact can be varied according to the hardness of the rock being drilled.

BACKGROUND OF THE INVENTION

Rock drills are widely used in mining and drilling operations such as those conducted during oil and mineral exploration. There are available many types of rock drills for these purposes. Most of these drills employ a hydraulically actuated piston which reciprocates to drive a cutting tool or drill steel. The percussive action of the piston driven cutting tool or drill steel cuts through the rock. A more efficient and effective rock drill is obtained when the reciprocating piston also rotates. It is typical for a rock drill to encounter rock of varying hardness during a mining or drilling operations. When this happens, the percussive impact frequency of the drill should be modified to correspond to the type of rock being drilled. The prior art, however, does not suggest a rock drill with both rotary and percussive action that can be easily adjusted to vary the percussive impact frequency in accordance with the hardness of the rock to be drilled.

The prior art has disclosed many different kinds of drills, including drills for use in rock drilling and mining operations. Some of these drills employ only a reciprocating piston mechanism, while others combine the reciprocation of the piston with a rotary motion. The combination of the simultaneous rotation and reciprocation of the piston produces an efficient and more effective drilling action than reciprocation alone.

U.S. Pat. No. 4,072,198 to Amteberg discloses a hydraulic rock drill which includes a hammer piston which reciprocates to pound an anvil carrying a drill string. The reciprocating action of the piston is controlled by the supply of pressurized hydraulic fluid to the piston. A slidable splint coupling between the piston and anvil enables the piston to rotate and reciprocate and allows the rotation of the piston to be transmitted to the anvil. However, precise control over piston impact frequency is not provided by this arrangement.

U.S. Pat. No. 4,366,868 to Salmi discloses a rock drill apparatus with a reciprocating striking piston which is integrally combined with a rotary tool as a one piece unit. This rock drill apparatus provides structure to loosen the tool when it is stuck in rock while the striking apparatus is pulled backward, which breaks the rock in which the tool is sticking and releases the tool. There is no suggestion in this patent of structure which would provide precise control over the percussion rate of the piston.

U.S. Pat. Nos. 4,343,227 and 4,355,691 to Karru et al. disclose hydraulic percussion apparatus for use as rock drills. The drill described in U.S. Pat. No. 4,343,227 has a reciprocating piston controlled by a fluid percussion circuit. The piston, however, does not rotate. The power of the percussion piston in the rock drill described in U.S. Pat. No. 4,355,691 is regulated by a control valve. A tool is connected to the drill body, and a motor is provided to rotate the tool. Simultaneous control of percussion power and rotation is provided by a hydraulic system. Neither of these drills suggests structure for controlling the percussion frequency, however.

U.S. Pat. Nos. 5,222,425 to Davies; 4,022,108 to Juvonen; 4,028,995 to Salmi et al.; and 4,070,949 to Salmi are illustrative of hydraulically operated percussion devices useful as rock drills in which piston reciprocation is controlled by the flow of hydraulic fluid. None of these drills also has a rotary piston or other rotary component. Moreover, controlling the percussion frequency of the piston is not suggested. The prior art, therefore, has failed to provide a hydraulically operated rotary percussion drill which provides precise control over the frequency of reciprocation of the drill piston so that the frequency of percussion can be varied as needed according to the kind of rock or other substrate being drilled.

SUMMARY OF THE INVENTION

It is a primary object of the present invention, therefore, to overcome the disadvantages of the prior art and to provide a hydraulically operated rotary percussion drill that provides precise control over the frequency of percussion.

It is another object of the present invention to provide a rotary percussion drill that can be adjusted to drill rock of different hardness effectively.

It is a further object of the present invention to provide a rotary percussion drill useful for mining applications.

It is yet another object of the present invention to provide a rotary percussion drill which enables the operator to work more productively in a safer environment.

It is yet a further object of the present invention to provide a rotary percussion drill characterized by lower sound levels than available drills.

The aforesaid objects are met by providing a hydraulically operated rotary percussion drill with a rotating reciprocating piston. Hydraulic power systems provide power for rotation and reciprocation. The drill includes a hydraulically powered cam-operated spring-loaded piston which reciprocates with a frequency that depends on the number of lobes on the cam. A high torque hydraulic motor provides the power for rotation through a pinion gear drive. Removal of dust and fine cuttings is provided by vacuum suction through the drill steel.

DESCRIPTION OF THE PREFERRED EMBODIMENTS

The rotary percussion drill of the present invention was designed for use in mining applications, such as drilling sandstone roof, and enables machine operators to work more productively in a safer environment than has heretofore been possible. Dust and drill bit cuttings are removed during drilling, and sound levels are lower than those of available drill systems. This drill is particularly suitable for tough drilling jobs. The drill of the present invention is capable of both rotary and percussion operations, which are separately controlled by hydraulically driven motors. In addition, the frequency of percussion may be precisely controlled by varying the configuration of a cam on a camshaft-operated piston.

Figure 1:
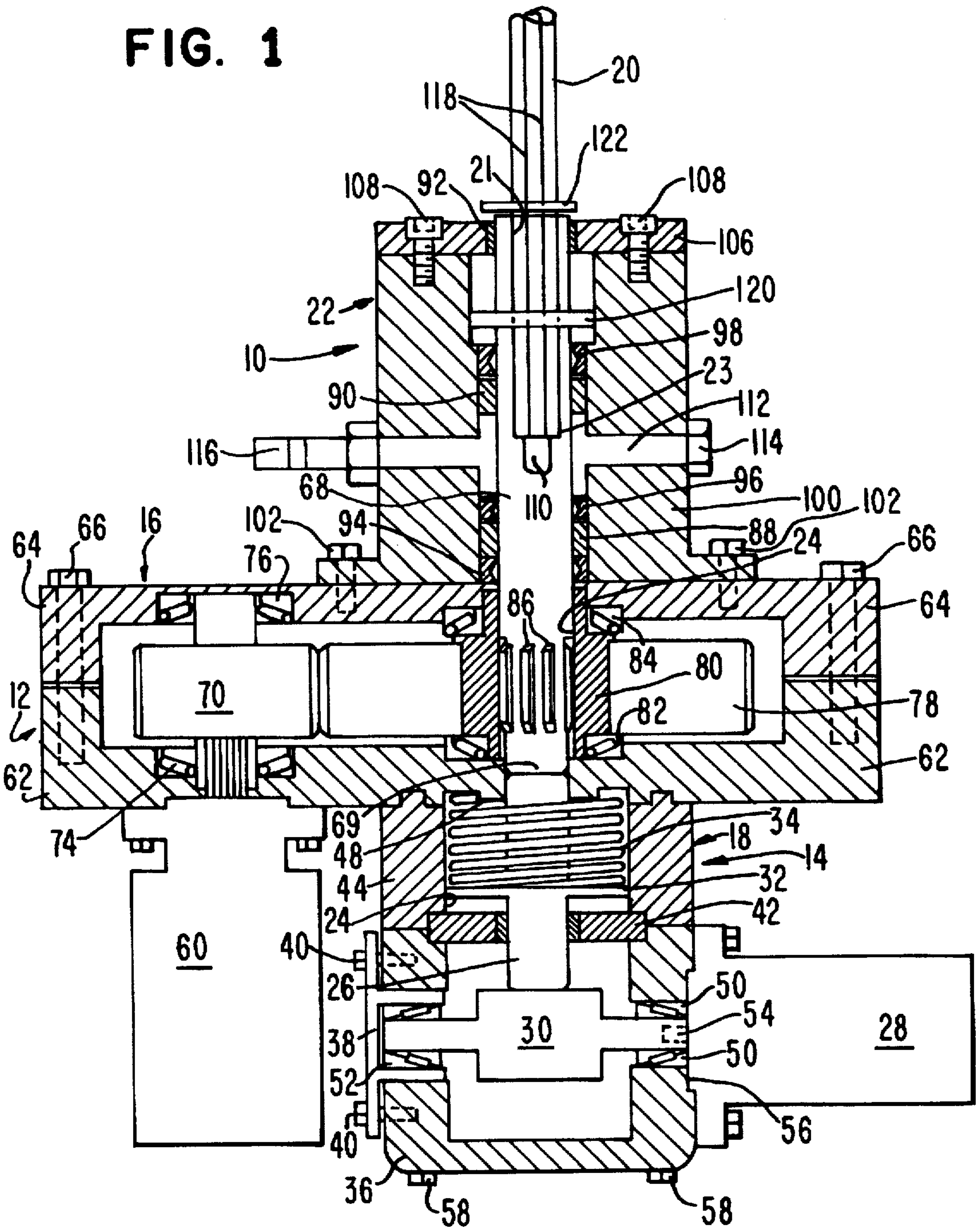
FIG. 1 illustrates the rotary percussion drill of the present invention in cross-section.

Referring to the drawings, FIG. 1 shows the drill 10 of the present invention in cross-section. The drill 10 includes a rotation portion 12 and a percussion portion 14. The rotation portion is contained within a rotation housing 16, and the percussion portion is contained within a percussion housing 18. A drill steel 20 extends axially from a drill steel housing 22. The rotation housing 16 is secured to an end of the percussion housing 18 and the drill steel housing 22 is secured to the rotation housing 16 so that these housings are axially aligned with the rotation housing between the percussion housing 18 and the drill steel housing 22. When all three housings are properly secured and axially aligned, a longitudinal channel 24, which has a varying diameter to accommodate all of the structures required for both the rotation and percussion operations of the drill, as will be explained in detail below, extends from the percussion portion 14 to the drill steel 20. The simultaneous operation of both the rotation portion 12 and the percussion portion 14 imparts both a rotary motion and a percussive or hammering motion to the drill steel as the drill operates, which enhances the effectiveness and efficiency with which the rock or other substrate is broken apart by the action of the drill steel.

Figure 2:
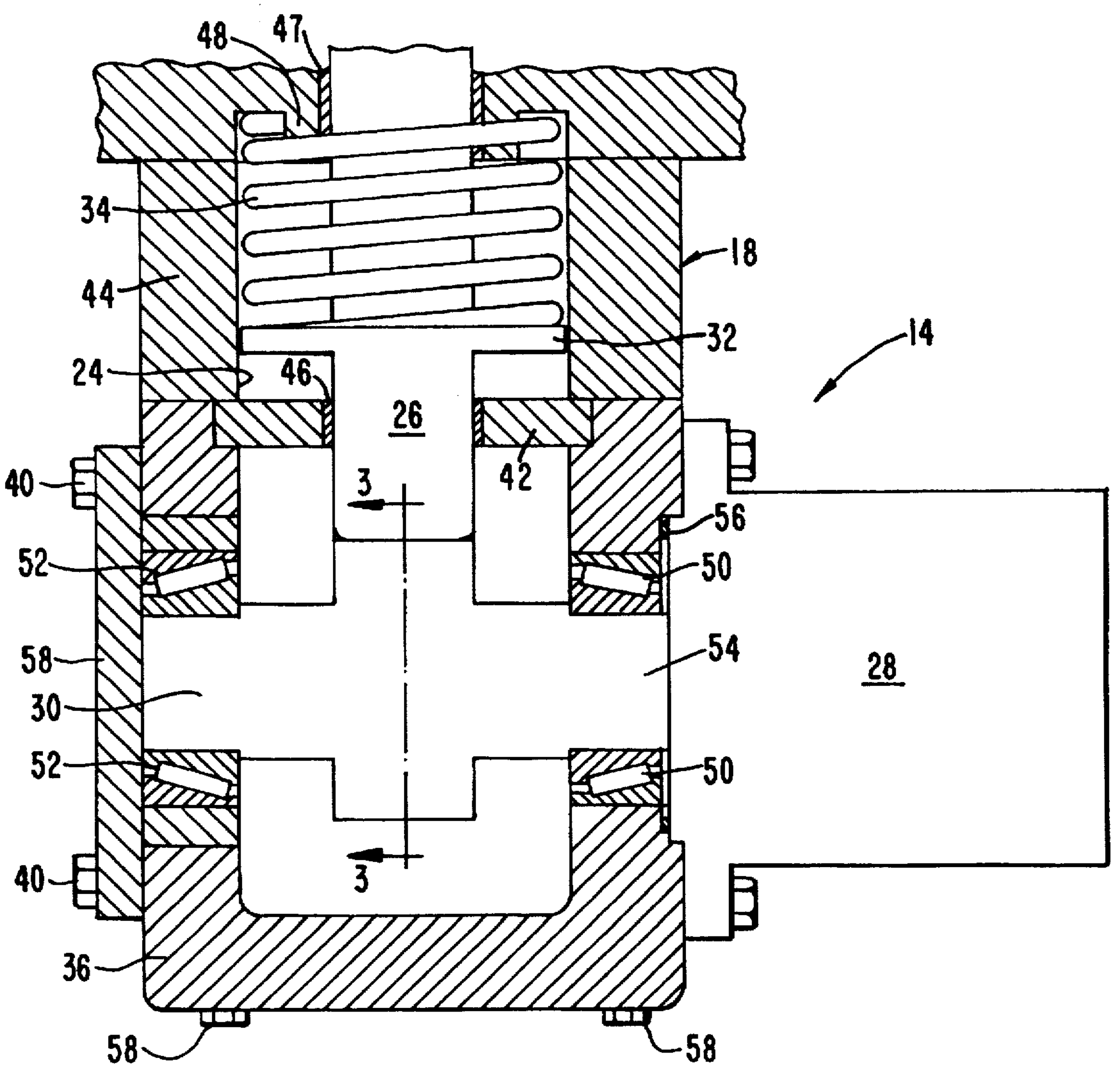
FIG. 2 illustrates the percussion portion of the drill of FIG. 1 in cross-section.
Figures 3A, 3B, 3C, 3D:
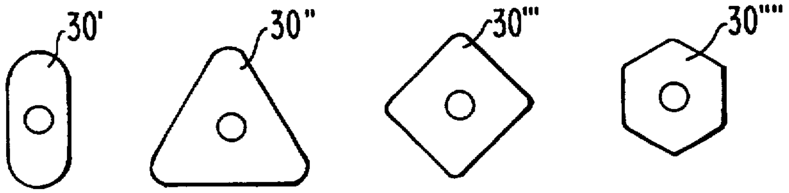
FIGS. 3*a*, 3*b*, 3*c*, and 3*d* illustrate possible camshaft cross-sectional configuration options for the percussion portion of the drill of the present invention as viewed along the line 3—3 in FIG. 2.

The percussion portion 14 of the drill, which is shown in detail in FIG. 2, operates within the housing 18 to cause a piston 26 to reciprocate axially within the channel 24. A percussion motor 28, which is preferably a hydraulic impact motor or the like, drives the piston 26 through a camshaft 30, which is operatively positioned between the percussion motor 28 and the piston 26. The piston 26 includes a piston stop 32 which secures one end of a spring 34. The spring 34 biases the piston 26 toward the camshaft 30.

The percussion housing 18 may be a substantially unitary structure, but is preferably formed of several components. The percussion motor 28 is secured to one side of a cam housing 36. A shim plate 38, which is removable to allow easy access to the camshaft 30, is attached, preferably by removable capscrews 40 as shown in the drawings. An annular piston stop plate 42 is positioned around the piston 26 in channel 24 at the junction of the cam housing 36 and a spring housing 44. An annular bushing 46 is located between the piston 26 and the piston stop plate 42. The percussion housing 18 also includes a spring retainer cap 48. The spring 34 extends about the piston 26 between the piston stop 32 and the spring retainer cap 48. A bushing 47 is provided about the piston 26 in the spring retainer cap 48.

The camshaft 30 is mounted in the cam housing 36 of the percussion portion housing 18 on bearings 50 and 52. The camshaft is operatively connected to the percussion motor 28 by a suitable coupling 54. A seal 56, such as an O-ring type of seal, is provided at coupling 54 around the end of the camshaft 30 which engages the percussion motor 28.

Figure 4:
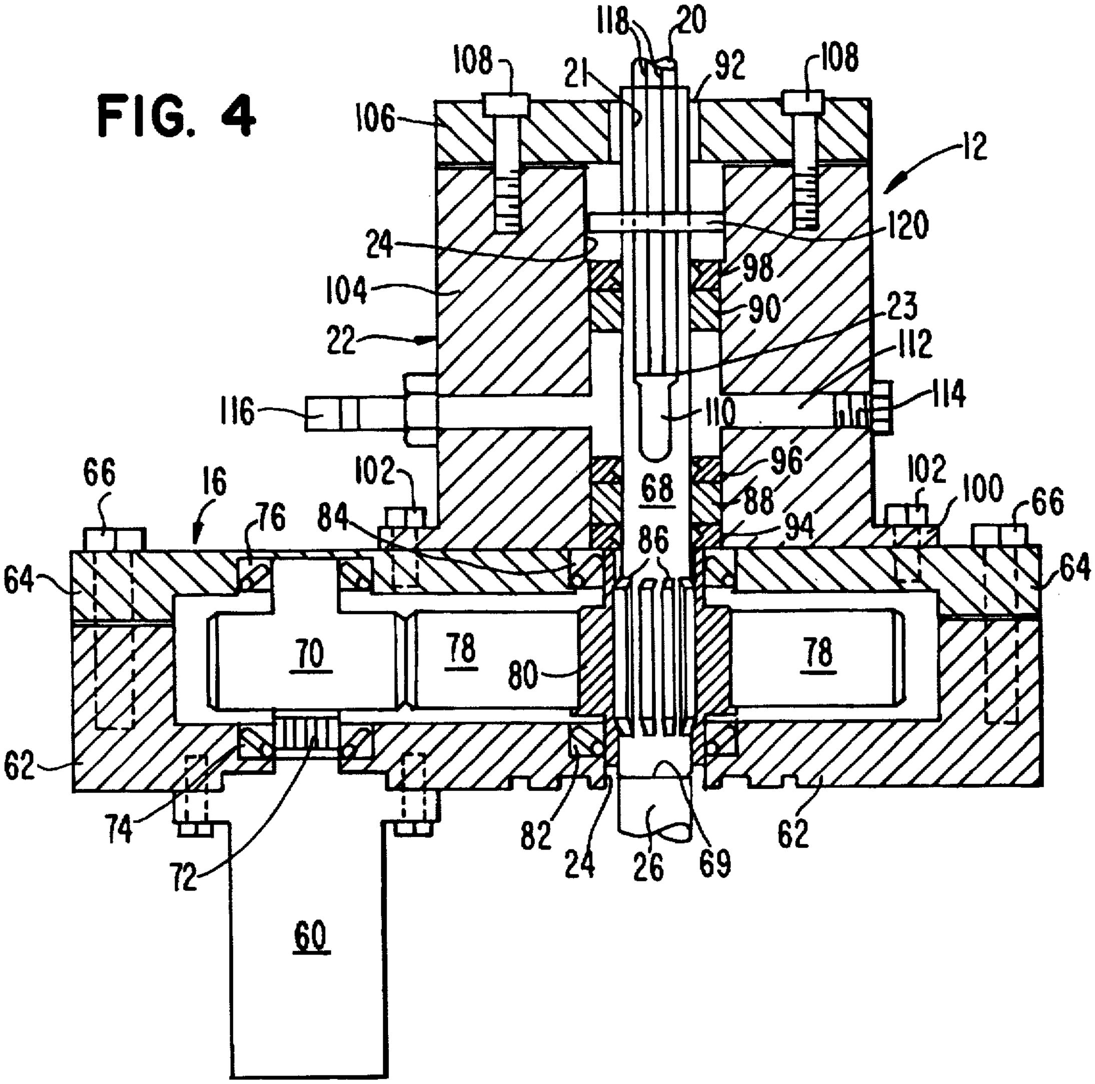
FIG. 4 illustrates the rotary portion of the drill of FIG. 1 in cross-section.

The rotation portion 12, which is shown in detail in FIG. 4, is enclosed in rotation portion housing 16, which is removably secured to the percussion portion housing 18 by through bolts 58 (FIGS. 1 and 2). The rotation portion 14 may be mounted on the percussion portion in either a right hand orientation, in which the rotation motor 60 is positioned on the right (not shown), or a left hand orientation, in which the rotation motor 60 is positioned on the left, as shown in FIGS. 1 and 4. Referring to FIG. 4, the rotation portion housing 16 includes two rotation gear box sections 62 and 64. Section 62, which is secured to the percussion housing 18 adjacent to the spring retainer cap 48, includes structure for attaching the rotation motor 60. The gear box section 64 mounts the drill steel housing 22 as shown in FIG. 1. At least one cap screw 66 is provided to hold the rotation gear box sections together.

A shank adapter 68, which preferably has a hollow shank, is located in channel 24 so that one end 69 of the adapter 68 contacts the piston 26 and can be driven to reciprocate axially when the piston is driven to reciprocate by the percussion motor 28. The mechanism for imparting rotation to the piston 26, adapter 68 and drill steel 20 is contained within the rotation portion 12. A motor pinion gear 70 is coupled to the rotation motor 60 by a coupling shaft 72. A pair of pinion bearings 74 and 76 is provided adjacent to opposite faces of the motor pinion gear 70. The pinion gear 70 engages a rotation gear 78, which is mounted on a rotation hub 80 about the adapter 68. Rotation bearings 82 and 84 are provided adjacent to opposite faces of the rotation gear 78. Elongated gear splines 86 located on the surface of the adapter 68 engage the rotation hub and rotation gear mechanism so that the adapter will rotate when the rotation motor is operating. As a safety feature, the shank adapter 68 has a recess 21 that is preferably about 4 inches deep and allows the drill steel 20 to extend this distance into the shank adapter 68. This permits the drill operator to guide the rotating drill steel 20 without using his hands.

Bushings 88, 90 and 92, which are preferably made of brass, are provided about the adapter at selected locations. In addition, dust seals 94, 96 and 98 are also provided to keep dust and fines generated by the drilling operations away from the rotating adapter 68 and gears 70 and 78.

The drill steel and adapter housing 22 is configured to be removably secured to the rotation portion housing 16. An annular flange 100 is provided to receive cap screws 102 which attach the drill steel and adapter housing 22 to the surface of the rotation housing 16 opposite the surface to which the percussion housing 18 is secured to provide a secure driving connection between the piston and drill steel by an adapter that is capable of both rotary and reciprocal motion. A seal housing section 104 is located adjacent to the flange 100, and a removable adapter retainer cap 106 is attached to the seal housing 104 by cap screws 108, which are preferably the socket head type as shown.

The adapter 68 has a substantially hollow shank to permit the removal of dust and fines generated during drilling. A port 110 is provided in the adapter 68 as an extension of recess 21 and is positioned adjacent to the terminus 23 of the drill steel 20 to align with a lateral channel 112 in the seal housing section 104. One or more plugs, such as plug 114, may be used to temporarily close the channel 112. A suction hose 116 may be attached to one end of the channel 112 to facilitate the removal of dust and fines through the port 110 and channel 112. Negative pressure applied to the hose 116 during drilling removes the dust, fines and cuttings during drilling and produces a cleaner drilling environment. This dust collection system will suck the dust away from the drill operator. Unlike available drills which use water to flush drill cuttings and, therefore, create a slipping hazard, the dry dust, frees and cuttings removal system of the present invention provides a safer work environment for the operator.

The drill steel 20 is preferably provided with elongated splines 118 on its external surface, which are configured and positioned relative to the gear splines 86 on the rotation hub to allow the drill steel to reciprocate through the rotation hub 80 while the rotation gear 78 is rotating. A locking ring 120, which is part of the shank adapter 68, keeps the shank adapter in place when the piston 26 strikes it. Locking ring 120 also retains the shank adapter 68 in the seal housing section 104. A retainer element 122 also helps to secure the shank adapter in the housing.

The percussion motor 28 and the rotation motor 60, both of which may be positioned toward either the right or left, are preferably hydraulic motors of the kind conventionally used with rock drills. Percussion motor 28 is preferably a hydraulic gear motor.

FIGS. *3a*, *3b*, *3c*, and *3d* show different cross-sectional configurations which may be used to form the cams on the camshaft 30. The camshaft may have these cross-sectional configurations or, alternatively, removable lobes with these configurations may be installed on a substantially cylindrical camshaft. FIG. *3a* shows a camshaft with a two lobed cam 30'. FIG. *3b* shows a camshaft with a three lobed cam 30". FIG. *3c* shows a camshaft with four lobed cam 30'". Although it is not shown, the camshaft could also be provided with a single lobe. FIG. *3d* shows a camshaft with a six lobed cam 30"". The frequency of the impact produced by the drill can be changed by varying the number of lobes on the camshaft 30. The camshaft 30 is driven by the hydraulic impact motor 28. When the motor is supplied with hydraulic fluid at a flow rate of about 14 gallons per minute and a pressure of about 1,500 psi, the motor speed will be approximately 1,000 rpm. With the three lobed cam 30" of FIG. *3b*, the drill will reciprocate to impact or produce blows at a frequency of 3,000 per minute, or 50 per second. The four lobed cam 30'" of FIG. *3c* will produce 4,000 blows per minute or 66.66 per second, making it and the six lobed cam 30"" of FIG. *3d* especially suitable for drilling extremely hard rock or other substrate. For soft rock drilling applications, the two lobed cam 30' will produce 2,000 blows per minute or 33.33 per second.

Proper rotation speed of the drill is achieved by the high torque hydraulic motor 60 turning the pinion gear 70 and the rotation gear 78. The flow of hydraulic fluid to this motor may be on the order of about 20 gallons per minute at 1,800 psi.

Prior to operation of the drill, the shim plate 38 is removed from the percussion section housing 18, and a camshaft 30 with one of the cross-sectional lobe configurations shown in FIGS. *3a–3d* is selected to correspond to the hardness of the rock being drilled. Preferably, a cam with one of the lobe configurations shown in FIGS. *3a–3d* is attached to the camshaft 30. The shim plate 38 is then re-attached. During the drilling operation the percussion motor 28 causes the camshaft 30 to rotate. The piston 26, which is normally biased toward the camshaft 30 by the compression spring 34, is typically lifted about ⅞ inch by contact with a lobe on the rotating camshaft so that the piston strikes the adapter 68. There will be a gap of ⅛ inch between the shank adapter 68 and the piston 26 when the shank adapter 68 is in full down stroke and when the piston is in the full down stroke. This action provides the impact required to penetrate hard rock. While the piston 26 is moving axially to strike the adapter 68, the rotation motor 60 is driving the pinion gear 70, which, in turn, drives the rotation gear 78. The axial splines 86 on the adapter engage the rotation hub 80, which simultaneously causes the adapter 68 to rotate while it is caused to reciprocate axially by the striking piston. This rotational and axially reciprocating movement is transferred to the drill steel 20, which actually contacts the rock or other substrate to be drilled. The speed of rotation is adjusted by adjusting the motor speed. If the drill steel encounters harder or softer rock than the rock initially drilled, the shim plate 38 can be easily removed to change the camshaft to one with a cam lobe configuration that will produce the optimum percussive impact.

Industrial Applicability

The rock drill of the present invention will find its primary application in mining and similar rock and mineral drilling operations where it is desired to have precise control over the impact produced by the drill so that the impact can be varied according to the hardness of the rock to be drilled. The rock drill of the present invention is especially suitable for difficult drilling jobs.

I claim:

1. A rotary percussion drill for use in drilling rock and in mining operations, said drill comprising:

(a) a percussion portion located in a percussion portion housing and including a piston positioned to reciprocate axially within an axial channel in said percussion portion housing, a percussion motor drivingly coupled to a camshaft located in one end of said axial channel, and a spring positioned around the piston adjacent to a second end of said axial channel to bias a terminal end of said piston into contact with a lobe on said camshaft;

(b) a rotation portion located in a rotation portion housing with an axial channel, a rotation motor drivingly coupled to a rotating pinion gear, said rotation portion housing pinion gear drivingly engaging a rotation gear positioned concentrically about a rotation hub adjacent to said axial channel, and an axial adapter engaging and extending through said rotation hub and beyond the rotation portion housing axial extent of said axial channel, wherein said rotation portion housing is secured to said percussion portion housing so that the axial channel in said rotation portion housing align with the axial channel in the percussion portion housing and said axial adapter aligns with and contacts said piston, said axial adapter being mounted for rotation in said rotation hub; and (c) a terminal housing section including an axial channel positioned to align with the rotation portion housing axial channel when said terminal housing section is attached to said rotation portion housing opposite said percussion portion housing, wherein said axial adapter extends into said terminal housing section axial channel to receive one end of a drill steel located in said terminal housing section axial channel, the opposite end of said drill steel extending exteriorly of said terminal housing section axial channel so that during the simultaneous operation of said percussion motor and said rotation motor said piston reciprocates in said percussion portion housing axial channel to contact said rotating axial adapter, causing said rotating adapter to also reciprocate and impart reciprocal and rotational motion to said drill steel.

2. The rotary percussion drill described in claim 1, wherein said camshaft has a cross-sectional configuration with two lobes spaced outwardly of the camshaft center.

3. The rotary percussion drill described in claim 1, wherein said camshaft has a cross-sectional configuration with three lobes spaced outwardly of the camshaft center.

4. The rotary percussion drill described in claim 1, wherein said camshaft has a cross-sectional configuration with four lobes spaced outwardly of the camshaft center.

5. The rotary percussion drill described in claim 1, wherein said camshaft has a cross-sectional configuration with six lobes spaced outwardly of the camshaft center.

6. The rotary percussion drill described in claim 1, wherein said percussion portion housing includes a spring retainer cap adjacent to said rotation portion housing and a piston stop plate spaced axially toward said spring retainer cap from said camshaft, said piston includes a radial flange located axially away from said piston terminal end, and said spring is positioned around the piston between the spring retainer cap and the radial flange.

7. The rotary percussion drill described in claim 6, wherein said percussion motor is secured to said percussion portion housing perpendicularly to said piston and said percussion portion housing further includes a removable shim plate secured to said percussion portion housing opposite said percussion motor and adjacent to the end of the camshaft opposite said percussion motor to provide access to said camshaft.

8. The rotary percussion drill described in claim 1, wherein said rotation portion housing includes axially positioned first and second gear box sections enclosing said pinion gear, said rotation gear and said rotation hub, said first gear box section is secured to said percussion portion housing, said second gear box section is secured to said terminal housing section, and said rotation motor is secured to said first gear box section.

9. The rotary percussion drill described in claim 8, wherein said axial adapter includes a plurality of spaced gear splines in the area of said adapter adjacent to said rotation hub.

10. The rotary percussion drill described in claim 1, wherein said terminal housing section includes a passage therethrough oriented perpendicularly to said axial channel, and said axial adapter includes an internal axial chamber with a port positioned to align with said passage so that said passage communicates with said internal axial chamber.

11. The rotary percussion drill described in claim 10, wherein a vacuum hose is attached to said passage to remove drill cuttings and fines through said internal axial chamber during drilling operations.

12. The rotary percussion drill described in claim 10, wherein a plurality of dust seals are spaced axially along said axial channel about said adapter adjacent to said passage in said terminal housing section.

13. The rotary percussion drill described in claim 9, wherein said drill steel includes a plurality of gear splines spaced to cooperate with the gear splines on said adapter during operation of said drill.

14. The rotary percussion drill described in claim 8, wherein said terminal housing section is secured to said second gear box section.

15. A rotary percussion drill for use in drilling rock and in mining operations, said drill comprising:

(a) a percussion portion located in a percussion portion housing and including a piston positioned to reciprocate axially within an axial channel in said percussion portion housing, a percussion motor drivingly coupled to a camshaft having a selected cross-sectional configuration with at least one lobe located perpendicularly in one end of said axial channel, and a spring positioned around the piston adjacent to a second end of said axial channel to bias a terminal end of said piston into contact with said at least one lobe on said camshaft;

(b) a rotation portion located in a rotation portion housing secured to said percussion portion housing with an axial channel that is axially aligned with said percussion portion housing axial channel, a rotation motor drivingly coupled to a rotating pinion gear, said pinion gear drivingly engaging a rotation gear positioned concentrically about a rotation hub adjacent to said axial channel, and an axial adapter engaging and extending through said rotation hub and beyond the axial extent of said rotation portion housing axial channel, said axial adapter aligns with and contacts said piston, said axial adapter including an axial chamber with a port; and (c) a terminal housing section including an axial channel positioned to align with the rotation portion housing axial channel when said terminal housing section is attached to said rotation portion housing opposite said percussion portion housing, wherein said axial adapter extends into said terminal housing section axial channel to receive one end of a drill steel located in said terminal housing section axial channel, the opposite end of said drill steel extending exteriorly of said terminal housing section axial channel so that during the simultaneous operation of said percussion motor and said rotation motor, said piston reciprocates in said percussion portion housing axial channel to contact said rotating axial adapter, causing said rotating adapter to also reciprocate and impart reciprocal and rotational motion to said drill steel, wherein said terminal housing section includes a passage extending between said axial channel and the exterior of said terminal housing section, and said port aligns with said passage to provide a communication path between said adapter axial chamber and the exterior of said terminal housing section.

16. The rotary percussion drill described in claim 15, wherein said camshaft has a cross-sectional configuration with two lobes spaced outwardly of the camshaft center.

17. The rotary percussion drill described in claim 15, wherein said camshaft has a cross-sectional configuration with three lobes spaced outwardly of the camshaft center.

18. The rotary percussion drill described in claim 15, wherein said camshaft has a cross-sectional configuration with four lobes spaced outwardly of the camshaft center.

19. The rotary percussion drill described in claim 15, wherein said camshaft has a cross-sectional configuration with six lobes spaced outwardly of the camshaft center.

20. The rotary percussion drill described in claim 15, wherein a vacuum hose is attached to said terminal housing section passage.

* * * * *